Jan. 9, 1968 W. F. STEINEN 3,362,634
DRAFT REGULATOR
Filed Oct. 24, 1965 2 Sheets-Sheet 1

INVENTOR
WILLIAM F. STEINEN
BY
ATTORNEY

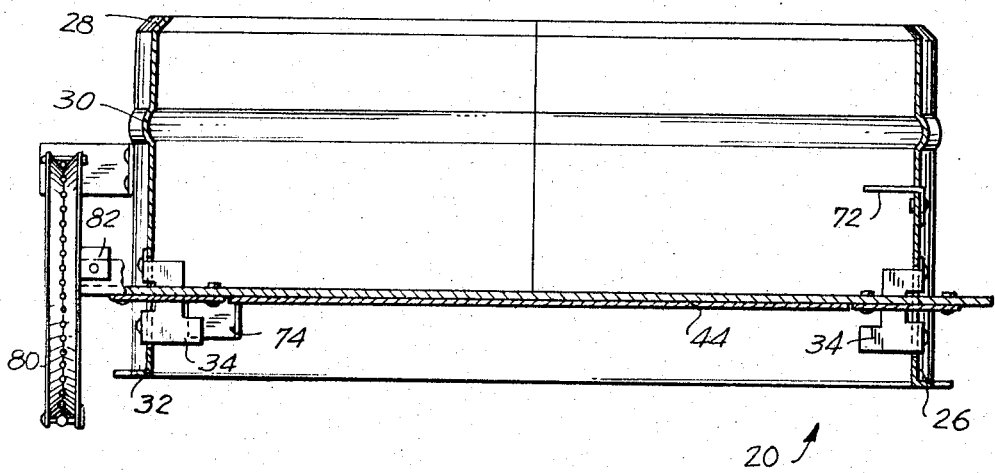
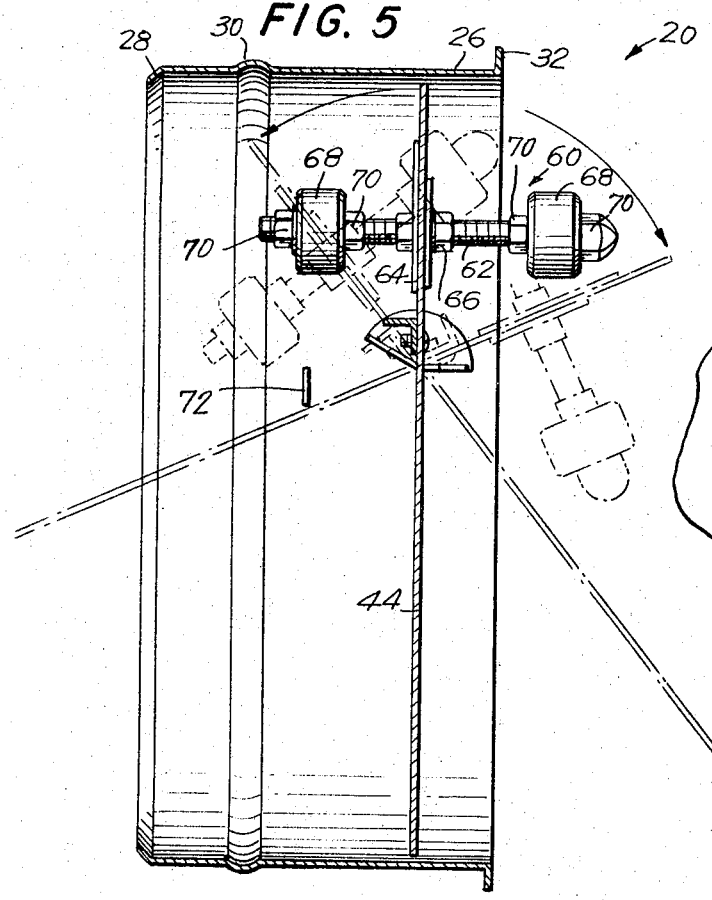
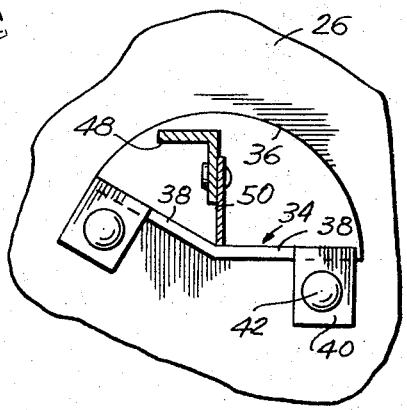

United States Patent Office 3,362,634
Patented Jan. 9, 1968

3,362,634
DRAFT REGULATOR
William F. Steinen, Short Hills, N.J., assignor to Wm. Steinen Mfg. Co., Parsippany, N.J., a corporation of New Jersey
Filed Oct. 24, 1965, Ser. No. 504,490
3 Claims. (Cl. 236—45)

ABSTRACT OF THE DISCLOSURE

The present disclosure relates to a draft regulator having an adjustable balancing means above the transverse horizontal axis of the vane and also a side pulley with adjustable and removable weights for controlling the initial position of the vane. The vane is supported on knife edges at the sides thereof on plates carried by the encircling collar.

Summary of invention

The present invention relates to draft controls.

More particularly, the invention relates to a draft control capable of being used in connection with furnaces, boilers, and the like, to participate in the control of the flow of air between the furnace or boiler and a stack or chimney with which is communicates.

It is one of the objects of the invention to provide a draft control of this type which can easily be adapted for use with gas-fired units or for use with units using liquid or solid fuels.

Thus, the objects of the present invention include the provision of a draft control which can easily be adapted either to be of a single-acting type or a double-acting type.

In addition, it is an object of the present invention to provide a draft control which is of an exceedingly simple construction providing an extremely reliable operation as well as ease of installation.

In addition, the objects of the present invention include the provision of a draft control which can very easily be adjusted so as to provide a predetermined initial position of a tiltable gate.

The objects of the invention also include the provision of a structure which mounts the tiltable gate for turning movement not only in an extremely simple manner but also in a manner enabling the gate to respond very easily to changes in the draft requirements so as to automatically tilt to positions admitting or excluding air as required.

Primarily with the structure of the invention there is a collar which has a central axis which extends horizontally when the collar is properly installed. A pair of knife-edge supports are carried by the collar and define a common pivot axis which extends perpendicularly across the central axis of the collar at an elevation substantially higher than this latter central axis, and this pivot axis also extends horizontally when the collar is properly installed. Situated within and substantially filling the collar is a gate which may have a position extending perpendicularly across the central axis of the collar with the central axis passing substantially through the center of gravity of the gate. If this central axis does not pass through the center of gravity of the gate it is at least in the region of the center of gravity of the gate. This gate carries a knife-edge means which rests on the pair of knife-edge supports for free swinging movement together with the gate about the above-mentioned pivot axis, so that as a result of the situation of the center of gravity of the gate beneath the latter pivot axis the gate tends to assume, when the pivot axis and central axis are both positioned so as to extend horizontally, a perfectly vertical position normal to the central axis of the collar. Through this simple combination of elements the gate is mounted so as to be quite sensitive in its response to draft requirements. The gate has in the collar sufficient clearance to provide for free, unobstructed swinging about the pivot axis through the required extent.

The invention is illustrated by way of example in the accompanying drawings which form part of the application and in which:

FIG. 4 is a transverse section of the structure of FIG. 3 taken along line 4—4 of FIG. 3 in the direction of the arrows;

FIG. 5 is a longitudinal section of the structure of FIG. 3 taken along line 5—5 of FIG. 3 in the direction of the arrows; and FIG. 6 is a vertical section taken along line 6—6 of FIG. 3 in the direction of the arrows and showing details of the structure which pivotally mounts the gate of the draft control of the invention.

Figure 1:
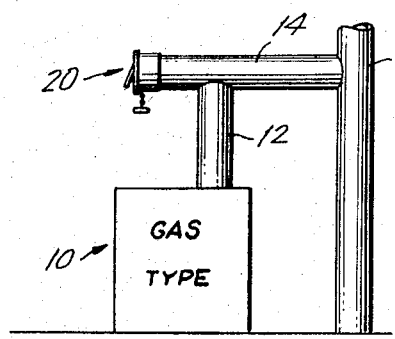
FIG. 1 is a schematic elevation of one type of installation which can be provided with the draft control of the invention.
Figure 2:
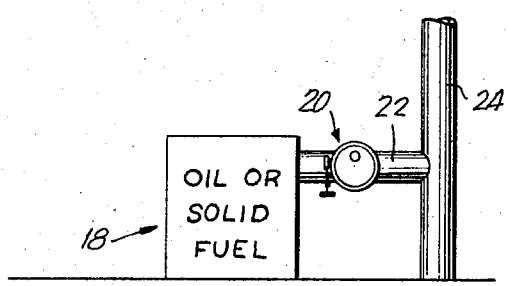
FIG. 2 is a schematic illustration of another type of installation which can be provided with the draft control of the invention.

FIGS. 1 and 2 respectively illustrate typical locations of the draft control of the invention in installations which are adapted to use the draft control of the invention. FIG. 1 shows a gas-type of installation where a gas-fired boiler or furnace 10 communicates through pipes 12 and 14 with the stack or chimney 16. Thus, these pipes 12 or 14 form a flue through which the combustion gases flow from the boiler or furnace 10 to the stack or chimney 16. In this type of installation it is best to situate the draft control 20 of the invention at the location indicated in FIG. 1 where the unit 20 is mounted on an extension of the pipe 14 which extends horizontally beyond the upwardly directed flue pipe 12. It is to be noted that in all cases the draft control 20 of the invention should not be situated lower than the elevation where the flue communicates with the chimney or stack.

In oil or solid fuel fired installations, such as that shown in FIG. 2, the furnace or boiler 18 will communicate through a horizontal flue pipe 22 with the stack or chimney 24. An additional pipe extends perpendicularly from the horizontal pipe 22 toward the viewer of FIG. 2 and is at the same elevation as the pipe 22, and the free end of this latter additional pipe carries the unit or draft control 20 of the invention in the manner indicated schematically in FIG. 2.

The details of the draft control 20 of the invention are illustrated in FIGS. 3–6. Thus, referring to FIGS. 3–6 it will be seen that the draft control 20 of the invention includes a collar 26 in the form of a sheet-metal sleeve of substantially cylindrical configuration. This sleeve 26 may be slightly tapered as indicated at its end 28 in FIG. 5, and also it may have a stiffening bead 30 formed therein. In addition at its right end, as viewed in FIG. 5, the collar 26 may have a suitable flange 32 directed outwardly so as to facilitate in the mounting of the control 20.

This collar 26 of the invention has a central axis which extends horizontally when the control 20 is properly installed. The collar 26 carries a pair of knife-edge supports 34 which define a pivot axis which extends horizontally across the central axis of the collar at an elevation substantially higher than this central axis, and this pivot axis will also extend horizontally when the control 20 of the invention is properly installed. As is apparent from FIG. 6, the collar 26 is formed with an opening 36 at the region where each support 34 is situated. Each support 34 includes a pair of walls 38 which intersect each other at an angle greater than a right angle but smaller than an angle of 180°, as shown most clearly in FIG. 6, so that the walls 38 of each support 34 define at their intersection the pivot axis for the gate, as will be apparent from the description which follows. In order to conveniently mount the pair of supports 34, they are provided at their ends with tabs 40 which are suitably riveted, for example, to the wall of the collar 26, and the pair of supports 34 extend inwardly from the wall of the collar 26 into the interior thereof, as is apparent from FIGS. 3 and 4. Instead of rivets 42 it is of course possible to use any other type of fasteners such as bolts and nuts, for example, in order to fixedly mount the pair of knife-edge supports 34 on the collar 26.

Figure 3:
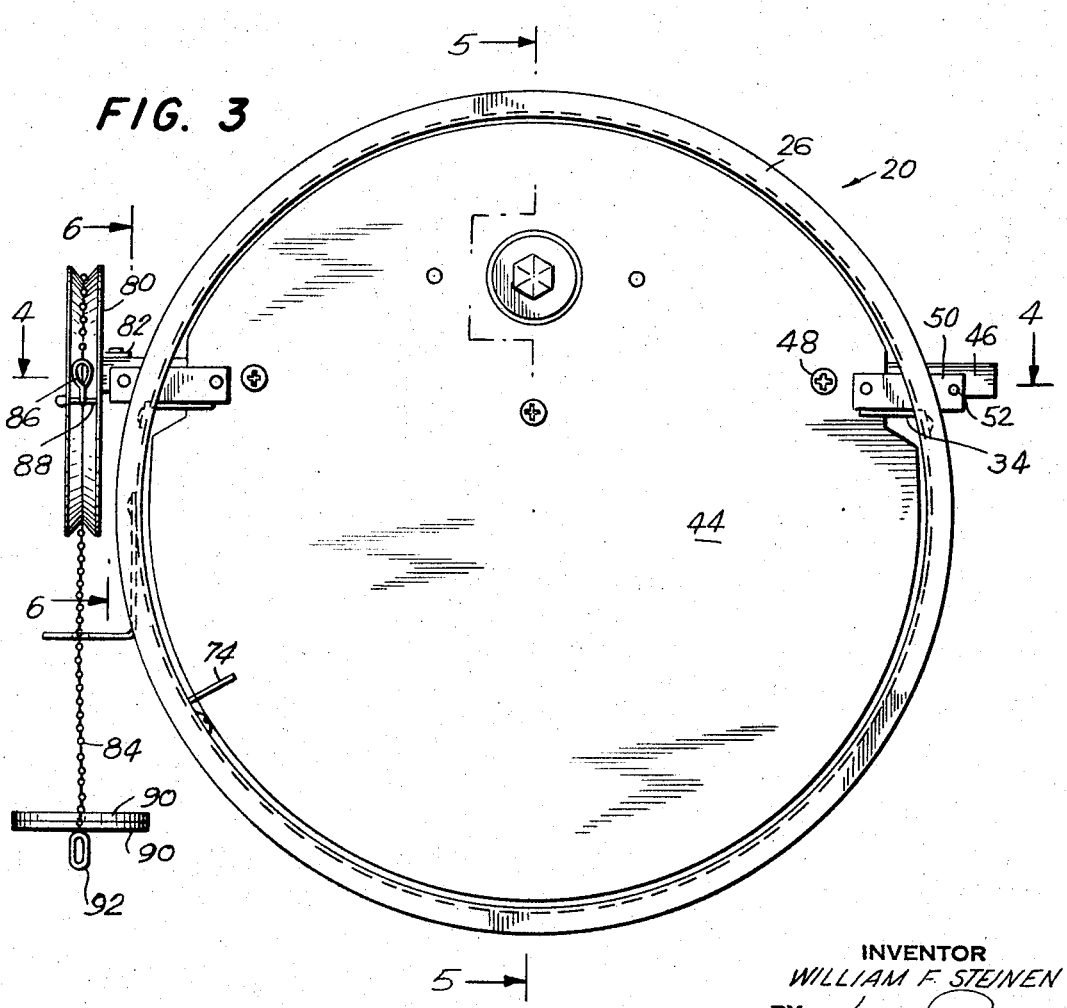
FIG. 3 is a front elevation of one possible embodiment of a draft control according to the invention.

Situated within and substantially filling the collar 26 is the gate 44 which has the configuration shown most clearly in FIG. 3. As is apparent from FIG. 5, this gate is in the form of a relatively thin sheet of fairly rigid metal, and while it substantially fills the collar, as indicated in FIG. 3, nevertheless it has in the collar sufficient clearance to enable the gate to swing in the manner indicated in dot-dash lines in FIG. 5, without any interference from the collar.

An elongated angle bar 46 extends completely across the gate 44 and is fixed thereto as by the screws 48, and this rigid angle iron 46 extends parallel to the pivot axis defined by the pair of knife-edge supports 34. The angle iron 46 fixedly carries a pair of knife-edge plates 50 which have their bottom free edges situated directly at the intersections between the walls 38 of the supports 34, in the manner shown most clearly in FIG. 6. The knife-edge members 50 are fixed to the angle iron 46 by any suitable screws, rivets, or the like, and a pair of rivets 52 are indicated in FIG. 3 as being used to connect each knife-edge member 50 to the angle iron 46. The gate 44 is notched at regions which receive the inner ends of the knife edge members 50, so that they are located in the same plane as the gate 44, as is clearly apparent from FIG. 4. Moreover, as is apparent from FIGS. 3 and 4, the angle iron 46 as well as the knife edge members 50 extend through and beyond the openings 36 so that they are situated partly within and partly without the collar 26, and in this way the collar itself does not in any way restrain the free mounting of the gate 44 for swinging movement. It is to be noted that since the pivot axis of the gate 44 is situated at a substantial distance above the center of gravity of the gate 44, the gate 44 will have an inherent tendency to assume automatically a perfectly vertical attitude hanging freely from the pivot axis. The central axis of the collar 26 will pass substantially through the center of gravity of the gate 44.

However, a balance means 60 is provided for the purpose of perfectly balancing the gate 44, and this balance means 60 is shown in detail in FIG. 5. It includes an elongated threaded stud 62 passing through an opening in the gate 44 which is situated directly over the horizontal axis of the collar 26. A washer and vertical compensating plate 64 engage the opposed faces of the gate 44, and the threaded member 62 passes through these members and carries a pair of lock nuts 66 which engage the members 64 and thus fix the threaded member 62 in the position indicated in FIG. 5 where it extends normally to the gate 44. A pair of weights 68 of substantially cylindrical configuration are formed with axial bores through which the member 62 freely passes so that these weights 68 can have their axial positions along the member 60 adjusted, and additional lock nuts 70 are carried by the member 62 and engage the opposed end faces of the weights 68, so that in this way their axial positions can be fixed. These weights have their positions adjusted so that a perfect balance of the gate 44 can be achieved.

This adjustment to achieve balance of the gate 44 is accomplished after the balance means 60 has been set in proper position by moving the entire assembly of the weights up or down in respect to the gate 44. The lock nuts 66 then may be fixed in position and permanently pinned in their location.

Within the collar 26 it situated a stop member 72 which limits the swinging of the gate 44 in a clockwise direction, as viewed in FIG. 5. This stop member 72 is simply in the form of an L-shaped metal piece having one leg riveted to the wall of the collar, as indicated in FIG. 4, while its other leg extends into the interior of the collar in the path of swinging movement of the gate so as to limit its clockwise turning in the manner indicated in FIG. 5.

Another stop may be provided above the hinge supports to prevent the hinge supports from being hit by the heavy vane 44.

In addition, the collar may be provided with a stop member 74 shown in FIG. 3 in front of the exterior face of the collar 44 which is visible in FIG. 3. This stop member 74 is also of a substantially L-shaped configuration and has one leg removably fixed with the collar 26. The stop member 74 is provided when it is desired to prevent the gate 44 from swinging in a counterclockwise direction, as viewed in FIG. 5. Thus, when it is desired to have a single-acting draft control the stop member 74 will be used. Such a control is generally desirable for use with furnaces or boilers fired with oil or solid fuel. With gas-fired units, however, a double-acting draft control is desired, and thus when the control 20 of the invention is used with a gas-type of installation, as shown in FIG. 1, the stop 74 will be removed and now the gate will be free to swing in both directions, as indicated in FIG. 5, so that in this way a double-acting control is provided. Therefore, it will be seen through the simple presence or absence of the stop 74 it is possible with the structure of the invention to provide an all purpose control for use either as a single-acting or a double-acting control.

It is often desirable to be able to initially position the gate 44 at a given angle when the control is installed. For example, when initially installed it is desirable to have a very slight tilt in the gate so that it does not close the collar to the fullest extent, and for some installations a somewhat larger opening may be desirable. For this purpose an adjusting means is provided, and this adjusting means includes the pulley 80 which at its right side, as viewed in FIG. 3, fixedly carries a tab 82 which is riveted or otherwise fixed directly to the angle member 46 in the manner shown most clearly in FIGS. 3 and 4. The mounting of this pulley 80 is such that its axis coincides with the pivot axis of the gate 44. Within the exterior V-groove of the pulley 80 is situated an elongated flexible member in the form of a chain 84. This chain carries at one end a hook 86 which hooks onto a pin 88 carried by the pulley so that the chain or flexible member 84 extends around the top of the pulley and can then hang freely therefrom at the rear part thereof, as viewed in FIGS. 3 and 4. At its bottom end the chain 84 carries a preselected number of washers 90 which form a weight. A suitable blocking member 92 is carried by the bottom end of the chain 84 so as to prevent the washers 90 from falling therefrom while at the same time permitting these washers to be mounted on the chain in a manner well known in the art. Thus, by preselecting the number of washers 90 it is possible to control the force acting through a moment arm equal to the radius of the pulley 80 on the gate so as to initially tilt the latter to a selected angular position with respect to its pivot axis. Therefore, simply by adding to or subtracting from the number of washers 90 it is possible to determine the initial angular position of the gate 44.

The number of washers 90 will determine the amount of draft necessary to open the gate 44.

It is apparent, therefore, that with the structure of the invention an exceedingly simple assembly of components provides a readily swingable, quite sensitive gate which will automatically respond to provide the required draft in a fully controlled and fully automatic manner. The structure of the invention is very easy to install as well as to adjust.

What is claimed is:

1. A draft control comprising a collar having a central axis which extends horizontally when said collar is properly installed, a pair of knife-edge supports carried by said collar and defining a pivot axis which extends perpendicularly across said central axis at an elevation substantially higher than said central axis and also in a horizontal direction when said collar is properly installed, a gate located in said collar and substantially filling the same, said central axis of said collar extending perpendicularly through said gate substantially at the center of gravity thereof, and a pair of knife edges fixedly carried by said gate and respectively resting on said knife-edge supports to mount said gate in said collar for free swinging movement about said pivot axis, said gate having in said collar a clearance sufficient to provide for a substantial degree of free swinging movement of said gate about said pivot axis and said gate normally tending to assume a vertical position due to the location of the center of gravity of said gate below said pivot axis and a V-shaped pulley mounted on the axis of the gate and turning with the gate and having an adjustable balancing means to regulate the draft necessary to open the gate and an additional double weight in both sides of the vane positioned above the center of gravity of the vane and above the axis of the vane to balance the vane, said last mentioned balance means including an elongated threaded member adjustable up and down the face of the gate, and a pair of weights positioned on opposite ends of said threaded member and on opposite sides of said gate and lock nuts on said threaded member for fixing the adjusted position of said weights, and stop members positioned below the pivot axis to limit the clockwise and counterclockwise swinging movement of the gate and capable of regulation to render said gate either single acting or double acting.

2. A draft control as recited in claim 1, wherein each of said knife-edge supports includes a pair of flat walls intersecting each other at an angle greater than 90° but less than 180° to define at said intersection the pivot axis, said knife edges being respectively received at the intersections of said walls of said knife-edge supports, an elongated angle member extending completely across and rigidly fixed onto said gate, said angle member extending parallel to said pivot axis and being spaced from said knife edge supports, and said knife edges being respectively fixed to said angle member and having bottom free edge portions engaging said supports at said inner sections between said walls thereof.

3. A draft regulator comprising a cylindrical collar having a horizontal axis and a swinging circular gate mounted in one end of said collar, a pair of angular bearing plates at each side of said collar projecting interiorly of said collar at positions substantially above the horizontal axis of the collar, knife edge members mounted on the sides of said gate to fit onto said angular plates and balance onto said angular plates, a pulley mounted on the outside end of one of said knife edge members, a flexible chain around said pulley and extending below said pulley, a plurality of removable disc weights mounted on said chain at the lower end thereof below the horizontal axis, an adjustable double weight carried by said gate and means to adjust said double weight upwardly and downwardly in respect to said horizontal axis, said double weight being positioned above the pivotal axis of the gate and stops carried by said collar below the pivot axis to control the swinging action of the gate.

References Cited
UNITED STATES PATENTS

| | | | |
|---|---|---|---|
| 1,848,850 | 3/1932 | Sturgis | 236—45 |
| 2,113,440 | 4/1938 | Cole | 236—45 |
| 2,671,615 | 3/1954 | Field | 236—45 |
| 2,682,299 | 6/1954 | Field | 236—45 |
| 2,761,494 | 9/1956 | Field | 236—45 |
| 3,070,312 | 12/1962 | Steinen | 236—45 |

WILLIAM J. WYE, *Primary Examiner.*